United States Patent
Bastin et al.

[11] Patent Number: 6,119,963
[45] Date of Patent: Sep. 19, 2000

[54] FULL BOOM PIVOT BREAKAWAY

[75] Inventors: Bruce G. Bastin, Starbuck; Luke D. Prouty, Benson, both of Minn.

[73] Assignee: Case Corporation, Racine, Wis.

[21] Appl. No.: 09/365,090

[22] Filed: Jul. 30, 1999

[51] Int. Cl.[7] .................................................. B05B 1/20
[52] U.S. Cl. ............................................................ 239/168
[58] Field of Search .................................. 239/166–168, 239/164

[56]  References Cited

U.S. PATENT DOCUMENTS

| | | | |
|---|---|---|---|
| 3,090,562 | 5/1963 | Richardson | 239/167 |
| 3,395,503 | 8/1968 | Greenburg et al. | 52/114 |
| 3,425,407 | 2/1969 | Furman et al. | 126/271.2 |
| 3,453,678 | 7/1969 | Gehman et al. | 15/50 |
| 3,481,545 | 12/1969 | Cooke et al. | 239/172 |
| 3,554,009 | 1/1971 | Van der Veen | 73/61 |
| 3,627,057 | 12/1971 | Hartwig et al. | 172/126 |
| 3,887,132 | 6/1975 | Widmer | 239/166 |
| 3,972,476 | 8/1976 | Hall | 239/167 |
| 4,011,914 | 3/1977 | Elmer | 172/126 |
| 4,044,914 | 8/1977 | Hopkins et al. | 220/93 |
| 4,044,952 | 8/1977 | Williams et al. | 239/165 |
| 4,221,353 | 9/1980 | Kuhn et al. | 248/292.1 |
| 4,288,034 | 9/1981 | Widmer et al. | 239/168 |
| 4,441,655 | 4/1984 | Blumhardt | 239/163 |
| 4,634,051 | 1/1987 | Dudley | 239/168 |
| 4,643,358 | 2/1987 | Jackson | 239/166 |
| 4,825,957 | 5/1989 | White et al. | 172/126 |
| 4,834,249 | 5/1989 | Dahl | 212/266 |
| 4,880,160 | 11/1989 | Patterson et al. | 239/167 |
| 5,027,525 | 7/1991 | Haukaas | 33/624 |
| 5,052,618 | 10/1991 | Carlon et al. | 239/77 |
| 5,248,091 | 9/1993 | Thyberg | 239/168 |
| 5,310,115 | 5/1994 | Broyhill | 239/168 |
| 5,408,756 | 4/1995 | Wahls | 33/624 |
| 5,485,796 | 1/1996 | Bassett | 111/33 |
| 5,542,190 | 8/1996 | Wahls | 33/624 |
| 5,630,547 | 5/1997 | Klemenhagen et al. | 239/161 |
| 5,785,128 | 7/1998 | Redekop | 172/126 |
| 5,957,383 | 9/1999 | Benest | 239/168 |

*Primary Examiner*—Andres Kashnikow
*Assistant Examiner*—David Hwu
*Attorney, Agent, or Firm*—Foley & Lardner

[57]  ABSTRACT

A boom assembly includes a central support, a first wing pivotably coupled to the central support so as to rotate about a first axis, a first cylinder-piston assembly having a first end pivotably coupled to the support, a second end pivotably coupled to the first wing at a first pivot point for rotation about a second axis on a first side of the first axis, and a second cylinder-piston assembly having a first end pivotably coupled to the support and a second end pivotably coupled to the first wing at a second pivot point for rotation about a third axis on a second side of the first axis. Extension and retraction of the first and second cylinder-piston assembly applies varying opposing torque to the first wing depending upon an angular orientation of the first wing about the first axis. In one exemplary embodiment, the first piston-cylinder assembly includes a cylinder coupled to one of the support in the first wing having a first chamber proximate the first wing and a second chamber distant the first wing, a piston disposed in the cylinder separating the first and second chambers and a rod coupled to the piston and the other of the support in the first wing. The boom assembly additionally includes a source of fluid and a fluid line in communication between the first chamber and the source of fluid. The fluid line is configured to restrict fluid flow to a maximum first rate from the first chamber to the fluid source as a volume of the first chamber is reduced. The boom assembly preferably includes a one-way valve in the fluid line preventing fluid flow from the source of fluid to the first chamber at a second maximum rate greater than the first maximum rate. In another exemplary embodiment, the boom assembly is provided as part of sprayer, wherein the first wing carries a plurality of spray nozzles fluidly connected to a fluid reservoir.

22 Claims, 4 Drawing Sheets

FULL BOOM PIVOT BREAKAWAY

FIELD OF THE INVENTION

The present invention relates to agricultural boom assemblies such as those used on agricultural sprayers and planters. In particular, the present invention relates to boom assemblies having pivotably supported wings.

BACKGROUND OF THE INVENTION

Boom assemblies are commonly used on agricultural vehicles and implements, such as sprayers and planters, to dispense seed, fertilizer, insecticide and herbicide over the large surface area of a field during a pass across the field. Such boom assemblies typically include a central support and at least one wing pivotably mounted to the central support to permit the wing to pivot in either direction out of its desired transverse spraying or planting position in response to being contacted by an abutment such as a post or tree. To return the wing to its neutral transverse spraying or planting position, some boom assemblies include springs or elastic cables of equal force connected to opposite sides of the wing.

In addition to being pivotable forward and rearward of the desired transverse spraying or planting position, the wing is also pivotable from the desired transverse spraying or planting position to a folded position which extends substantially parallel to the implement or vehicle supporting the wing. In the folded position, the wing and the boom assembly itself are better suited for transport. Pivoting the wing from the generally transverse spraying or planting position to the folded position typically performed either manually or by a single hydraulic cylinder piston mounted between the boom and the central support.

Although such boom assemblies are commonly employed on agricultural vehicles and implements, such boon assemblies have several drawbacks. First, such boom assemblies require multiple components: multiple springs to return the wing to the desired spray position after hitting an obstruction and a hydraulic piston cylinder assembly to pivot the wing to the folded position. This multitude of components increases the cost and complexity of the boom assembly. Secondly, during movement of the wing to the folded position, one of the two springs actually works against the hydraulic cylinder piston assembly. As a result, the spring is either stretched, which reduces its useful life, or must be disengaged. Third, such boom assemblies provide limited control over the rate at which the wing pivots in response to engaging an obstruction.

Thus, there is a continuing need for a boom assembly having a pivoting wing which requires fewer parts, which may be easily moved between a spraying or planting position and a folded position and which provides greater control over the rate at which the wing pivots.

SUMMARY OF THE INVENTION

The present invention provides a boom assembly including a central support, a first wing pivotably coupled to the central support so as to rotate about a first axis, a first cylinder-piston assembly having a first end pivotably coupled to the support, a second end pivotably coupled to the first wing at a first pivot point for rotation about a second axis on a first side of the first axis, and a second cylinder-piston assembly having a first end pivotably coupled to the support and a second end pivotably coupled to the first wing at a second pivot point for rotation about a third axis on a second side of the first axis. Extension and retraction of the first and second cylinder-piston assembly applies varying opposing torque to the first wing depending upon an angular orientation of the first wing about the first axis.

The present invention also provides a boom assembly including a support, a first wing pivotably coupled to the support so as to rotate about a first axis, a first force applying member having a first end pivotably coupled to the support and a second end pivotably coupled to the first wing at a first pivot point for rotation about a second axis on a first side of the first axis and a second core supplying member. The first force applying member is configured to apply a first force to the first wing while the second force supplying member is configured to apply a second force to the first wing such that the first and second force applying members apply opposing equal torque to the first wing about the first axis, whereby the first wing is held in a spray position. The second force supplying member is also configured to apply a third force to the first wing such that the first wing is moved to a folded position.

The present invention also provides a boom assembly including a support, a wing pivotably coupled to the support so as to rotate about a first axis, the first means coupled between the support and the wing for applying a first force to the wing on a first side of the first axis, and second means coupled between the support and the wings for applying a second force to the wing on a second opposite side of the first axis such that the first and second means apply opposing equal torques to the wing about the first axis, wherein the wing is held in a spray position. The second means is also configured for applying a third force to the wing such that the wing is moved to a folded position.

The present invention also provides a sprayer including a fluid reservoir, a central support, a plurality of ground-engaging motive members supporting the fluid reservoir and the central support above ground, a wing pivotably coupled to the support so as to rotate about a first axis, a plurality of spray nozzles fluidly connected to the fluid reservoir and carried by the wing, a first cylinder-piston assembly having a first end pivotably coupled to the support and a second end pivotably coupled to the wing at a first pivot point for rotation about a second axis on a first side of the first axis, and a second cylinder-piston assembly having a first end pivotably coupled to the support and a second end pivotably coupled to the wing at a second pivot point for rotation about a third axis on a second side of the first axis. Extension and retraction of the first and second cylinder-piston assemblies applies varying opposing forces to the wing depending upon an angular orientation of the wing about the first axis.

In one exemplary embodiment, the first piston-cylinder assembly includes a cylinder coupled to one of the support and the first wing and having a first chamber proximate the first wing and a second chamber distant the first wing, a piston disposed in the cylinder separating the first and second chambers and a rod coupled to the piston and the other of the support in the first wing. The boom assembly additionally includes a source of fluid and a fluid line includes communication between the first chamber and the source of fluid. The fluid line is configured to restrict fluid flow to a maximum first rate from the first chamber to the fluid source as the volume of the first chamber is reduced. In one exemplary embodiment, the boom additionally includes a one-way valve in the fluid line permitting fluid flow from the source of fluid to the first chamber at a second maximum rate greater than the first maximum rate.

DETAILED DESCRIPTION OF THE PREFERRED EMBODIMENTS

Figure 1:
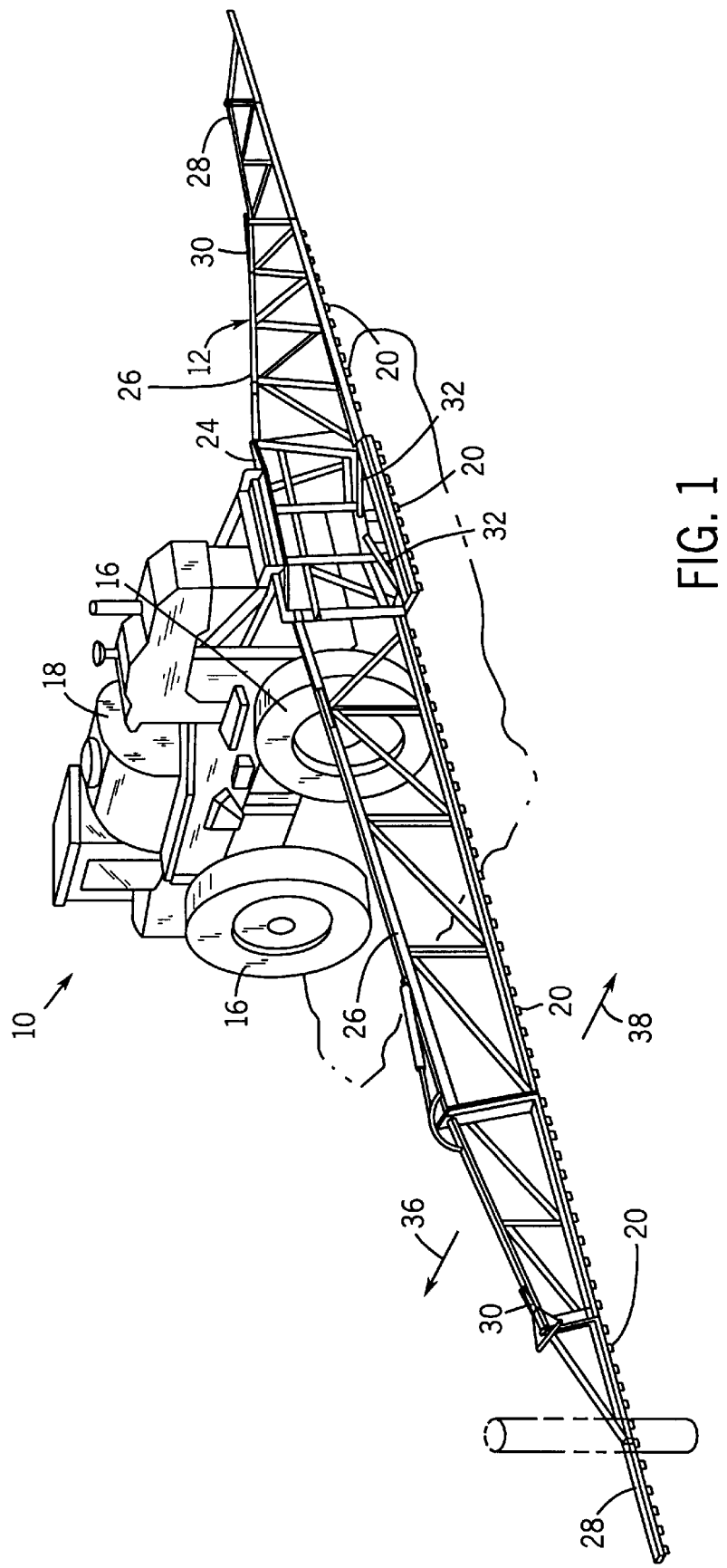
FIG. 1 is a rear perspective view of a self propelled sprayer including an exemplary boom assembly having a wing return and actuation system of the present invention.

FIG. 1 is a rear perspective view of a self-propelled sprayer 10 including an exemplary boom assembly 12 of the present invention. In addition to boom assembly 12, sprayer 10 includes chassis 14, ground-engaging motive members 16, fluid reservoir 18, and spray nozzles 20. Chassis 14 comprises a conventionally known underlying frame of sprayer 10 which is itself supported above ground by ground-engaging motive member 16. Ground-engaging motive member supports chassis 14 as well as fluid reservoir 18 and boom assembly 12 above the ground or other growing medium. Ground-engaging motive member 16 preferably comprise tires. Alternatively, ground-engaging motive member 16 may comprise tracks or other mechanisms for propelling sprayer 10 across a dry or fluid growing medium.

Fluid reservoir 18 is conventionally known and is configured to contain and store fluid, such as herbicide, insecticide or herbicide, prior to the fluid being applied to the soil or other growing medium by spray nozzles 20. Spray nozzles 20 are conventionally known and are carried and supported by boom assembly 12 along an axis extending generally transverse to chassis 14.

Boom assembly 12 is supported by chassis 14 and generally includes central support 24, wing 26, wing tip 28, tip break away systems 30 and wing break away and actuation system 32. Central support 24 mounts to chassis 14 and supports wings 26 as well as the remaining components of boom assembly 12. In the exemplary embodiment, central support 24 additionally supports spray nozzles 20. Central support 24 comprises a rigid central frame mounted to chassis 14 at a rear of sprayer 10. As will be appreciated, central support 24 may have a variety of sizes, shapes and configurations depending upon the span of boom assembly 12 as well as the configuration of chassis 14 and sprayer 10. Furthermore, central support 24 may alternatively be integrally formed or mounted to a forward end of chassis 14 and sprayer 10 or a central intermediate portion of chassis 14. In some applications, central support 24 may actually be provided by chassis 14.

Wings 26 comprise elongate members pivotally coupled to central support 24 for rotation about generally vertical axes on opposite transverse sides of sprayer 10. Wings 26 carry spray nozzles 20 and support wing tips 28.

Wing tips 28 are supported at opposite tips of wings 26 and further carry additional spray nozzles 20. In the exemplary embodiment, wing tips 28 are also pivotably coupled to wings 26 for rotation about generally vertical axes. Because wing tips 28 extend at the outer extremities of wings 26, wing tips 28 are more susceptible to accidentally contacting obstructions. Because wing tips 28 are pivotably coupled to wings 26, wing tips 28 are configured to pivot and fold inwardly away from the obstruction. Wing tip return mechanisms 30 extend between wings 26 and wing tips 28 and are configured to return tips 28 to a normal predetermined spraying position as shown in FIG. 1. Wing tip return mechanisms 30 are described in greater detail in co-pending application Serial No. 09/365,361 entitled BOOM TIP BREAK AWAY by Bruce G. Bastin and Luke D. Prouty, filed on the same date herewith, the full disclosure of which is hereby incorporated by reference.

Similar to tips 28, wings 26 are also susceptible to encountering obstructions during spraying operations. Because wings 26 are pivotably coupled to central supports 24, wings 26 pivot either forward (as indicated by arrow 36) or rearwardly (as indicated by arrow 38) in response to contacting an obstruction. Wing return and actuation mechanisms 32 return wings 26 to the predetermined normal spray position showing in FIG. 1 after wings 26 have passed the obstruction. In addition, systems 32 also selectively pivot wings 26 and tips 28 to a folded position to reduce the span of boom assembly 12. In the exemplary embodiment, systems 32 pivot wings 26 and tips 28 forwardly such that wings 26 extend substantially parallel with chassis 14 and sprayer 10 to facilitate transport of sprayer 10 along roads and highways and to facilitate compact storage and housing of sprayer 10 when not in use.

Figure 2:
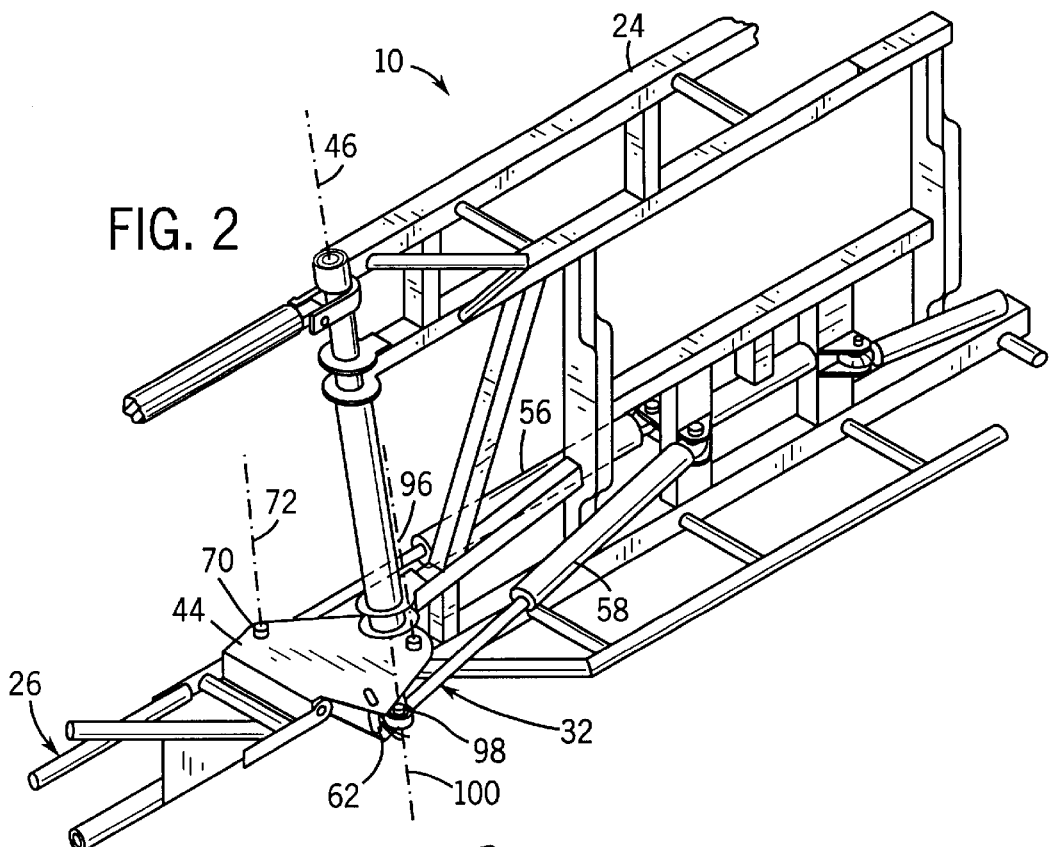
FIG. 2 is an enlarged fragmentary perspective view of the boom assembly and the wing return and actuation system of FIG. 1.
Figure 3:
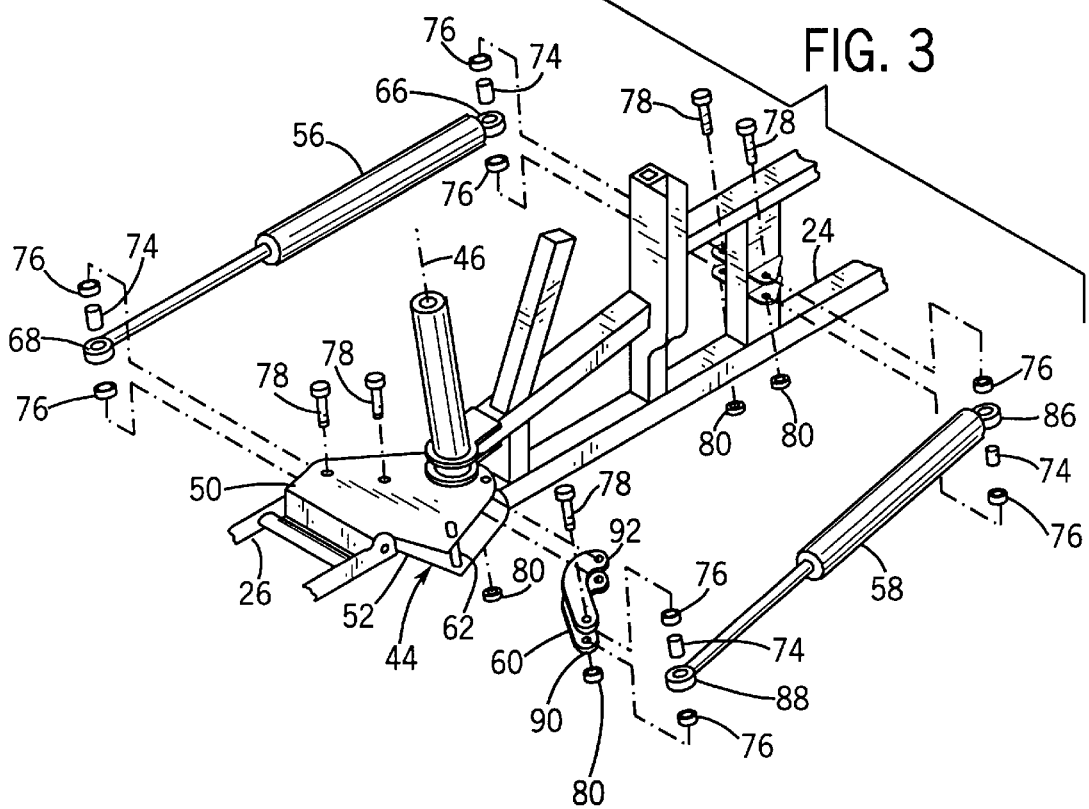
FIG. 3 is an exploded fragmentary perspective view of the boom assembly and the wing return actuation system of FIG. 2.

FIGS. 2 and 3 illustrate one of wing return and actuation systems 32 in greater detail. The other of wing return and actuation systems 32 is substantially identical thereto. FIG. 2 is a fragmentary perspective view of system 32 extending between central support 24 and wing 26. FIG. 3 is an exploded fragmentary perspective view of system 32 between central support 24 and wing 26. As best shown by FIGS. 2 and 3, wing 26 includes a mounting portion 44 pivotably coupled to central support 24 for rotation about axis 46. In the exemplary embodiment, mounting portion 44 comprises a pair of opposing plates 50, 52 through which an inner breakaway shaft (not shown) extends such that its ends are journaled within bores on central support 24. As will be appreciated, mounting portion 44 may have a variety of alternative configurations and may be pivotably coupled to central support 24 for rotation about axis 46 by a variety of alternative pivoting mechanisms and structures. As noted above, because wing 26 is pivotably coupled to central support 24 about axis 46, wing 26 may pivot either forwardly or rearwardly, in a generally horizontal plane, upon encountering an obstruction. Afterwards, system 32 returns wing 26 to a predetermined normal spraying position. In addition, wing 26 may be pivoted to a forward position by system 32.

System 32 generally includes cylinder-piston assemblies 56, 58, link 60, and stop surface 62. Cylinder-piston assembly 56 is a force applying member preferably comprising a hydraulic cylinder-piston assembly fluidly coupled to a source of hydraulic pressure (not shown). Assembly 56 has a first end 66 pivotably coupled to support 24 and a second end 68 pivotably coupled to mounting portion 44 of wing 26 at a first pivot point 70 so as to rotate about axis 72 on a front side of axis 46. In the exemplary embodiment, ends 66 and 68 are pivotably coupled to central support 24 and wing 26 by bushings 74, washers 76, bolts 78 and nuts 80.

Piston-cylinder assembly 58 has an end 86 pivotally coupled to support 24 and in opposite ends 88 pivotally coupled to mounting portion 44 of wing 26. However, instead of being directly pivotably coupled to mounting portion 44, end 88 is indirectly coupled to mounting portion 44 by link 60.

As best shown by FIG. 3, link 60 extends between end 88 of cylinder-piston assembly 58 and mounting portion 44 of wing 26. Link 60 has a first end 90 pivotally coupled to end 88 and a second opposite end 92 pivotally coupled to mounting portion 44 of wing 26. In the exemplary embodiment, end 86 is pivotally coupled to support 24, end 88 is pivotally coupled to end 90 of link 60, and end 92 of link 60 is pivotally coupled to mounting portion 44 by bushings 74, washers 76, bolts 78 and nuts 80.

As best shown by FIG. 2, stop surface 62 is provided by a member extending between plates 50 and 52 on a rear side of axis 46. Stop surface 62 engages link 60 to limit rotation link 60 about axis 96. As a result, link 60 and stop surface 62 cooperate to pivotably couple end 88 of cylinder-piston assembly 58 to mounting portion 44 about two distinct axes depending upon the relative positioning of mounting portion 44 and wing 26. In the position shown in FIG. 2, link 60 is engaged against stop surface 62. As a result, cylinder-piston 58 applies a force to mounting portion 44 and wing 26 at pivot point 98 about axis 100.

Figure 4:
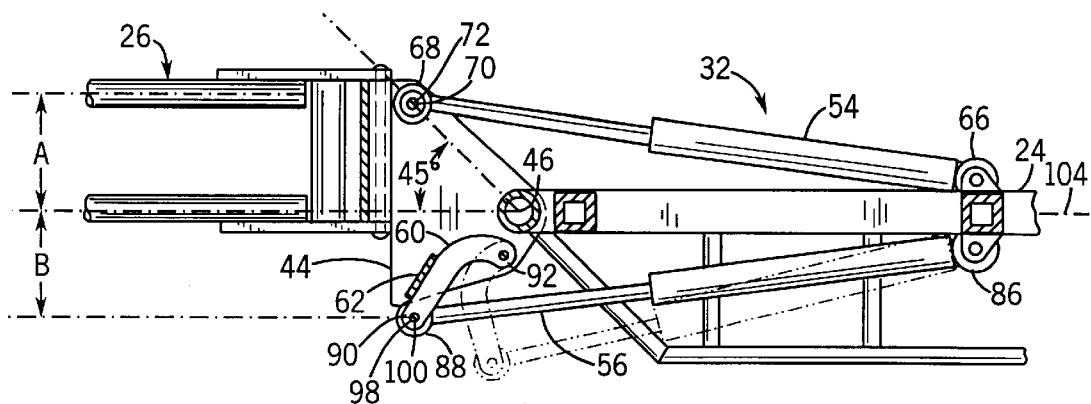
FIG. 4 is a top elevational view of the boom assembly and wing return and actuation system of FIG. 1 with the wing in a neutral position.
Figure 5:
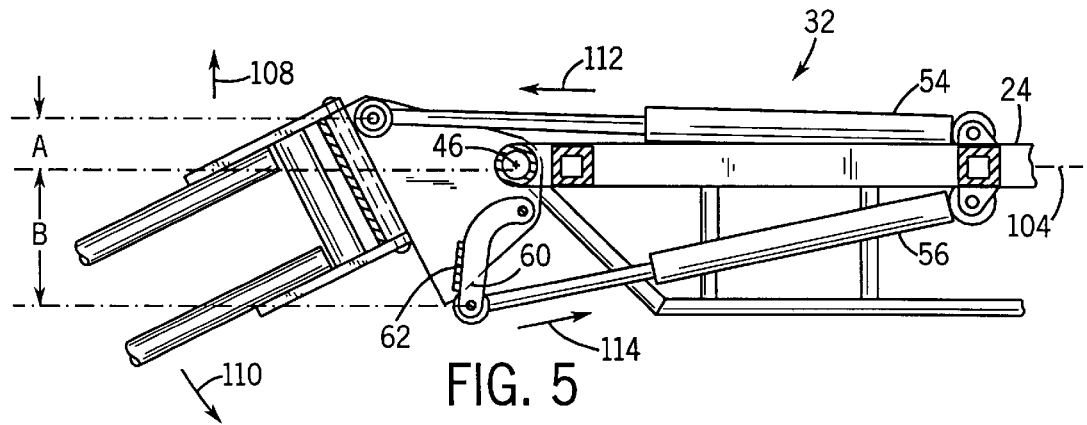
FIG. 5 is a top elevational view of the boom assembly and the wing return and actuation system of FIG. 4 with the wing pivoted in a first direction.
Figure 6:
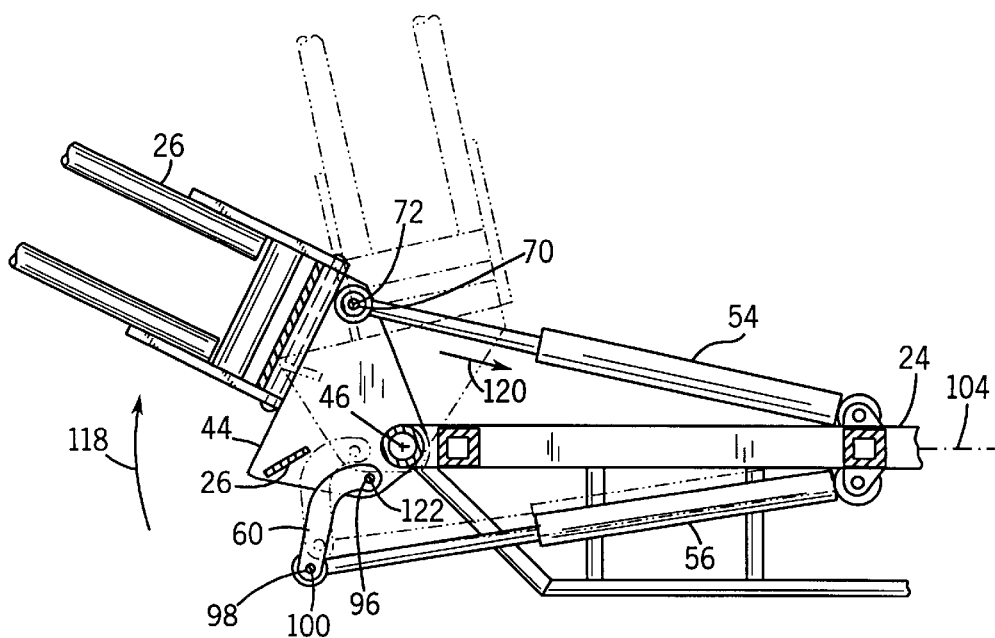
FIG. 6 is a top elevational view of the boom assembly and the wing return and actuation system of FIG. 4 with the wing pivoted in a second opposite direction and proximate a folded position shown in phantom.

FIGS. 4–6 best illustrate the operation of system 32. FIGS. 4–6 illustrate system 32 actuating wing 26 between a spray position, a break away position and a folded position, respectively. FIG. 4 illustrates wing 26 in a neutral spray position in which wing 26 extends generally transverse to sprayer 10 and generally parallel to plane 104 containing axis 46. In the spray position, link 60 abuts stop surface 62 such that end 88 is effectively pivotably coupled to mounting portion 44 at pivot point 98 about axis 100. As a result, assembly 56 applies force to mounting portion 44 of wing 26 at pivot point 98 on a rear side of axis 46 and plane 104 while assembly 54 applies force to mounting portion 44 of wing 26 at pivot point 70 about axis 72 on a front side of axis 46 and plane 104. Consequently, assemblies 56 and 54 apply opposing torque to wing 26. In particular, assembly 56 applies torque to wing 26 in a clockwise direction as best seen in FIG. 4 while assembly 54 applies torque to wing 26 in a counterclockwise direction as seen in FIG. 4. To position wing 26 in the neutral spray position shown in FIG. 4, assemblies 54 and 56 must apply equal opposing torques to wing 26 when wing 26 is in the neutral spray position. The torque applied by each assembly 54, 56 is a function of the force applied by assemblies 54 and 56 and the lever arm at which the force is applied, namely, the perpendicular distance separating each of pivot points 70 and 98 from plane 104 containing axis 46. In the exemplary embodiment, pivot points 70 and 98 are each angularly spaced from axis 46 by approximately 45 degrees and are each equidistantly spaced from plane 104. As a result, assemblies 54 and 56 are each provided with substantially equal hydraulic pressures so as to apply substantially equal forces to wing 26 at pivot points 70 and 98. Consequently, assemblies 54 and 56 apply equal but opposite torques to wing 26 such that wing 26 is held or maintained in the spray position shown in FIG. 4. Alternatively, system 32 may be reconfigured such that pivot points 70 and 98 are not equidistantly spaced from axis 46 and plane 104. In such an alternative configuration, assemblies 54 and 56 would apply unequal forces to wing 26 at such pivot points in appropriate amounts so as to still apply equal but opposing torques to wing 26.

FIG. 5 illustrates wing 26 and system 32 as wing 26 is engaging an obstruction (not shown). Upon engaging an obstruction while moving forward in the direction indicated by arrow 108, wing 26 pivots about axis 46 rearwardly in the direction indicated by arrow 110. As a result, assembly 54 is extended in the direction indicated by arrow 112 while stop surface 62 transmits force to link 60 and in turn to assembly 56 to compress assembly 56 in the direction indicated by arrow 114 upon accidentally impacting an obstruction.

After disengagement with the obstruction, assemblies 54 and 56 automatically return wing 26 to the neutral spray position shown in FIG. 4. As shown in FIG. 5, after wing 26 pivots about axis 46, the lever arm A of assembly 54 is much smaller than the lever arm B of assembly 56. As a result, even though assemblies 54 and 56 apply equal force to wing 26, assembly 56 applies a greater torque as compared to assembly 54. Because of this greater torque applied by assembly 56, wing 26 will return to its initial spray position by pivoting in a clockwise direction about axis 46 to the original spray position shown in FIG. 4 in which the lever arms A, B of assemblies 54 and 56, respectively, are once again equal.

In addition to having the ability to break away upon impacting an obstruction and to automatically return to the spray position shown in FIG. 4, systems 32 are also configured to pivot wing 26 from the spray position to a folded position in which wing 26 extends at least 45 degrees and preferably substantial parallel to the general longitudinal axis of chassis 14 and sprayer 10. As shown in FIG. 6, system 32 pivots wing 26 clockwise (as seen in FIG. 6) in the direction indicated by arrow 118 such that wing 26 extends forward from central support 24. In the exemplary embodiment, wing 26 is pivoted by retraction of assembly 54 in the direction indicated by arrow 120. To this end, assembly 54 preferably comprises a dual-acting hydraulic cylinder-piston assembly. Alternatively, system 32 may utilize a pair of opposite single-acting cylinder-piston assemblies coupled between central support 24 and wing 26, wherein one of the assemblies maintains wing 26 in the spray position and wherein the other of the assembly moves wing 26 to the forward position. As further shown by FIG. 6, during movement of wing 26 to the folded position, mounting portions 44 of wing 26 pivots about axis 46 to also move stop surface 26 out of engagement with link 60. As a result, assembly 56 is no longer pivotably coupled to mounting portion 44 at pivot point 98 but is pivotably coupled to wing 26 at pivot point 122 about axis 96. This secondary pivot point provided by link 60 facilitates movement of wing 26 to the folded position.

Figure 7:
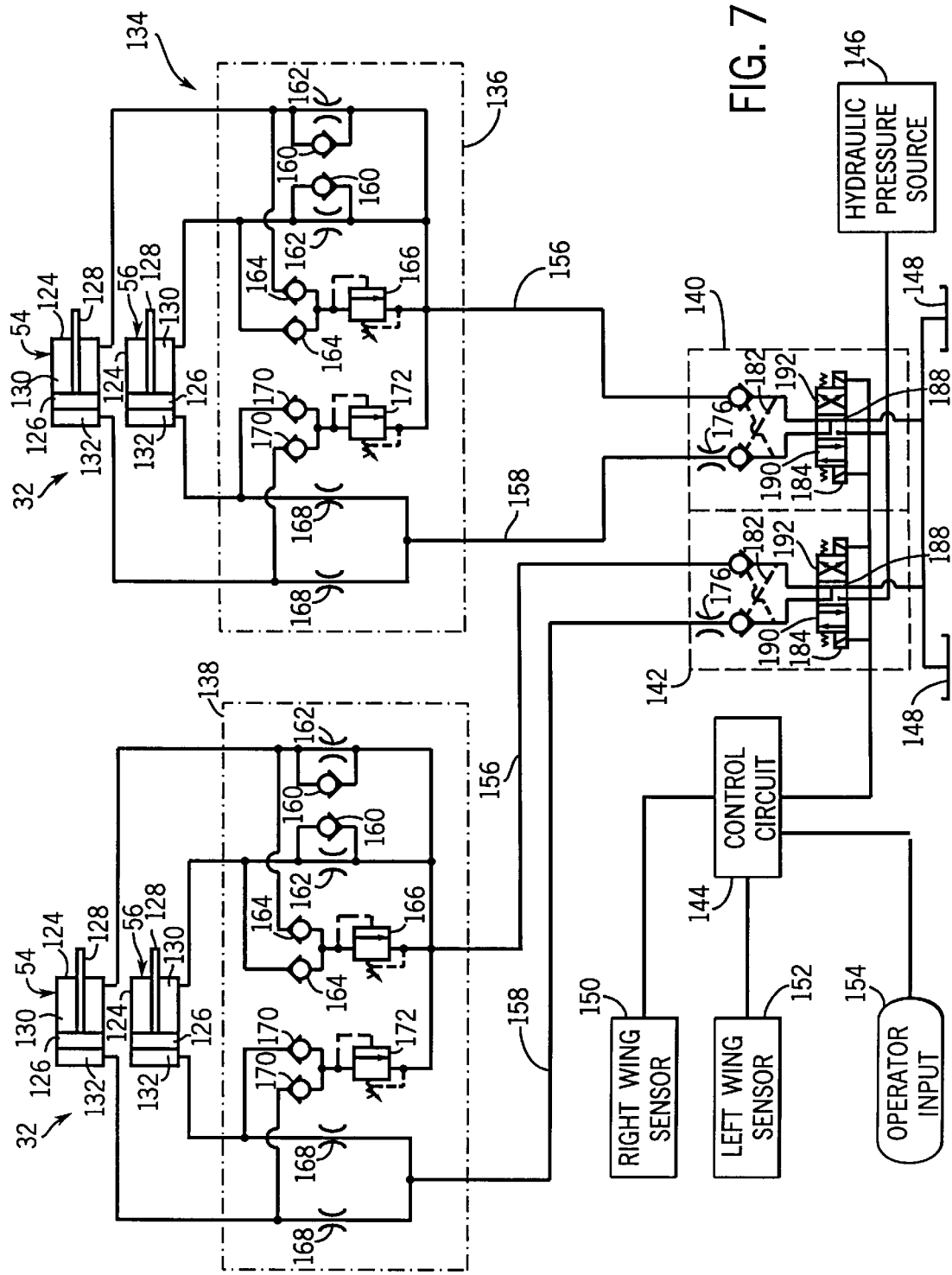
FIG. 7 is a schematic illustrating a preferred hydraulic system and hydraulic cylinder-piston assemblies of the wing return and actuation system.

FIG. 7 is a schematic illustrating details of assemblies 54, 54 and a preferred hydraulic system 134 for systems 32 of both wings 26 (shown in FIG. 1). As noted above, assemblies 54 and 56 preferably comprise dual-acting cylinder piston assemblies. As best shown by FIG. 7, assemblies 54 and 56 each include a cylinder 124, a moveable piston 126 disposed within the cylinder, and a rod 128 coupled to piston 126. As shown in FIG. 5, cylinders 124 of assemblies 54 and 56 are coupled to support 24 while rods 128 are coupled to wing 26. As will be appreciated, this coupling arrangement may be reversed wherein rods 128 are coupled to support 124 and cylinders 124 are coupled to wing 26.

Pistons 126 divide the interiors of cylinders 124 into chambers 130 and 132. Chambers 130 are located proximate to wing 26 while chambers 132 are located distant from wing 26. Chambers 132 are each in fluid communication with a source of hydraulic pressure (not shown), whereby chambers 132 are filled with hydraulic fluid to exert pressure on pistons 126 to thereby apply force to wing 26. As noted above, assemblies 54 and 56 are configured to apply equal but opposing torques to wing 26 when wing 26 is in the spray position. Because assemblies 54 and 56 have substantially equal lever arms A, B when wing 26 is in the neutral spray position (shown in FIG. 4), the source of hydraulic pressure 136 is configured to apply equal hydraulic pressure to pistons 126 of assemblies 54 and 56.

As shown by FIG. 8, hydraulic system 134 includes two substantially identical units 136 and 138, valve assemblies 140, 142, control circuit 144, pump or hydraulic pressure source 146, hydraulic tank or reservoir 148, right wing sensor 150, left wing sensor 152 and operator input 154. Units 136 and 138 as well as valve assemblies 140 and 142 are substantially identical to one another. Accordingly, for ease of illustration, only unit 136 and valve assembly 140 are described in detail. As shown by FIG. 7, unit 136 is fluidly coupled to valve assembly 140 by fluid lines 156 and 158 and generally includes one-way check valves 160, restrictor orifices 162, one-way check valve 164, relief valve 166, restrictor orifices 168, one-way check valve 170 and relief valve 172. Each of check valves 160, 164, 170, relief valves 166, 172, and restrictor orifices 162 and 168 is conventionally known. Valve assembly 140 controllably connects fluid lines 156 and 158 to hydraulic pressure source 146 or reservoir 148 in response to signals from control circuit 144. Valve assembly 140 generally includes restrictor orifice 176, PO valve 182 and valve 184. Valve 184 preferably comprises a solenoid valve electrically coupled to control circuit 144. Valve 184 is conventionally known and has a spool actuatable by electric solenoids to three states or positions: an off position 188, an extension position 190 and a folding position 192. In the off position 188 (shown in FIG. 7), valve 184 connects both fluid lines 156 and 158 to reservoir 148. As a result, neither assembly 54 nor assembly 56 is pressurized. Valves 184 are biased to position 188 when wings 26 are in a folded position or when the transmission of sprayer 10 is in neutral.

In the extension position 190, unit 134 pressurizes assemblies 54 and 56 to extend and position wings 26 in a neutral or spray position shown in FIG. 4. In addition, assemblies 54 and 56 automatically return wings 26 to the neutral or spray position upon engaging an obstruction. As shown by FIG. 7, in the extension position 190, fluid line 158 is connected to hydraulic pressure source 146 while fluid line 156 is connected to reservoir 148. As a result, hydraulic fluid from source 146 flows through fluid line 158, through restrictor orifices 168 and into chambers 132 of both assemblies 54 and 56 such that assemblies 54 and 56 apply equal and opposing forces to wing 26 (shown in FIG. 5). At the same time, natural back pressure with system 134 draws hydraulic fluid into chambers 130 of assemblies 54 and 56. As a result, assemblies 54 and 56 support and maintain wing 26 in the neutral spray position shown in FIG. 4.

However, upon encountering an obstruction, wing 26 will pivot and move pistons 28 to thereby collapse one of chambers 130 and expand the other of chambers 130 of assemblies 54 and 56. For example, when encountering an obstruction such as shown in FIG. 5, rod 128 of assembly 54 is extended, collapsing chamber 130 and expanding chamber 132. At the same time, rod 128 of assembly 56 retracts to collapse chamber 132 and expand chamber 130. As this happens, fluid within chamber 130 of assembly 54 is expelled through restrictor orifice 162 and through line 156 to reservoir 148. Restrictor orifice 162 restricts fluid flow to a maximum predetermined rate so as to provide controlled pivotal movement of wing 26 (shown in FIG. 5) while hitting an obstruction or experiencing momentum changes during turns. If pressure within collapsing chamber 130 becomes too great, relief valve 166 dumps fluid at a faster rate to reservoir 148 through line 156.

As chamber 130 of assembly 54 is collapsing, chamber 132 of assembly 54 is expanding. During this time, hydraulic fluid under pressure is continuously supplied from pressure source 146 to chamber 132.

As rod 128 of assembly 54 extends, rod 128 of assembly 56 retracts. During such retraction, piston 126 and rod 128 move to expand chamber 130 and contract chamber 132. Due to back pressure within system 134, expansion of chamber 130 of assembly 56 causes chamber 132 to fill with hydraulic fluid. Contraction of chamber 132 by piston 126 expels hydraulic fluid which flows past check valves 170 and builds pressure on release valve 172. At a predetermined threshold, release valve 172 dumps fluid from chamber 132 to fluid line 156 and reservoir 148.

In the folding position 192, valve 184 fluidly connects fluid line 156 to hydraulic pressure source 146 and fluidly connects fluid line 158 to reservoir 148. As a result, hydraulic fluid from hydraulic pressure source 146 is directed through line 156 and through check valves 160 to each of chambers 130 of assemblies 54 and 56 to simultaneously retract rods 128 of assemblies 54 and 56. As a result, assemblies 54 and 56 pivot wing 26 as shown in FIG. 6 to a folded position. During the folding of wing 26, pistons 126 collapse chambers 132 which expels hydraulic fluid within chambers 132 through restrictor orifices 168 to reservoir 148.

Control circuit 144 comprises a conventionally known control circuit electrically connected to solenoid valves 184 of valve assemblies 140 and 142. Control circuit 144 generates a control signal to actuate electrical solenoids of valves 184 to move the spools of valves 184 between the off position 188, the extension position 190 and folding position 192. Control circuit 144 is configured to individually control each valve 184 to independently control the movement of each of wings 26. As it will be appreciated, control circuit 144 may comprise either an analog or a digital circuit.

In the exemplary embodiment, control circuit 144 generates a control signal based upon inputs from right wing sensor 150, left wing sensor 152 and operator input 154. Right wing sensor 150 and left wing sensor 152 are substantially identical to one another and sense the angular positions of wings 26 relative to central support 24. In the exemplary embodiment, right wing sensor 150 and left wing sensor 152 each preferably comprise a metal member in the shape of a pie coupled to wing 26 and extending 15 degrees on either side of plane 104, and a magnetic Hall effect switch (which requires the adjacent presence of metal to close its contacts) coupled to central support 24 adjacent to the metal member. Alternatively, other well known angular position sensors may be employed. As a result, when wing 26 is within 15 degrees of either side of plane 104, the contacts of the Hall effect sensor are closed to transmit an electrical signal to control circuit 144.

Operator input 154 comprises one or more conventionally known controls located in the cab of the sprayer or other agricultural implement. In exemplary embodiment, operator input 154 includes a speed and directional control, preferably a hydrostatic drive control joystick (not shown). A signal indicating the position of the speed and directional control joystick is generated by input 154 and is transmitted to control circuit 144.

In operation, starting with wings 26 in folded positions, actuation of input 154 by the operator causes control circuit 144 to generate a control signal such that the solenoids of valves 184 move valves 184 to the extension position 190. In the extension position, valves 184 connect fluid lines 158 to pressure source 146 which causes rods 128 of assemblies 54 and 56 to extend and pivot wings 26 out of the folded positions until sensors 150 and 152 indicate to control circuit 144 that wings 26 are within 15 degrees on either side of plane 104, at which point, control circuit 144 generates a control signal to cause valves 184 to once again return to the off position 188.

In response to right wing sensor 150 and left wing 152 indicating that wings 26 are in a near extended position, i.e. within 15 degrees of plane 104 (as shown in FIG. 5), and also in response to receiving a signal from operator input 154 indicating that the speed and directional hydrostatic control is moved out of a neutral position, control circuit 144 generates a control signal causing valves 184 to move out of a normally biased off position 188 to the extension position 190 again to cause assemblies 54 and 56 to pivot wing 26 until wing 26 is in the neutral or spray position, parallel with plane 104. To once again move wing 26 back to the folded position, the operator manipulates input 154. In response to appropriate manipulation of operator input 154, control circuit 144 further generates a control signal causing the solenoid of valve 184 to move valve 184 to the folding position 192 which, as described above, causes assemblies 54 and 56 to pivot wing 26 to the folded position.

In the exemplary embodiment, hydraulic fluid pressure source 156 pressurizes chambers 130 to approximately 2700 psi. Back pressure within reservoir 176 is approximately 40 psi. Restrictor orifices 162 have an inner diameter of about 0.031 inches, restrictor orifices 168 have an inner diameter of approximately 0.045 inches, restrictor orifices 176 have an inside diameter of approximately 0.045 inches, relief valve 166 has a set point of approximately 1500 psi and relief valve 172 has a set point of approximately 2,950 psi. As will be appreciated, these configurations are largely dependent upon the particular specifications of boom assembly 12 as well as the anticipated obstruction forces.

FIG. 7 illustrates but one exemplary embodiment of wing return and actuation systems 32. Various other embodiments are also contemplated within the scope of the present disclosure. For example, in lieu of fluid lines 156 and 158 being selectively coupled to hydraulic pressure source 146 and reservoir 148 by valve assemblies 140 and 142, fluid line 156 may be permanently fluidly coupled to reservoir 148 while fluid line 158 is permanently coupled to hydraulic pressure source 146. In such an alternative configuration, alternative means would be necessary to pivot wings 26 to a folded position. However, such an alternative system would still automatically return wings 26 to the neutral position after engaging an obstruction.

Furthermore, although systems 32 are illustrated as being controlled by a control circuit 144 having sensors 150, 152 and operator input 154, system 132 may alternatively omit sensors 150 and 152 and rely solely upon operator input 154 for causing control circuit 144 to generate control signals such that valves 184 are moved between the off position 188, the extension position 190 and the folding position 192.

Overall, systems 32 of boom assembly 12 provide a cost-effective mechanism for automatically returning wings 26 to the spray position after hitting an obstruction or after pivoting due to momentum changes. In addition, system 32 also provide for controlled pivoting of wings 26 when engaging obstructions or during turns. Moreover, system 32 pivots wings 26 from the spray position to a folded position. Although less desirable, system 32 may alternatively be configured to eliminate particular functions. For example, system 32 may alternatively be configured to merely automatically return wing 26 to the spray position. In such an alternative construction, wing 60 may be omitted such that end 88 of assembly 58 is pivotally coupled directly to mounting portion 44 proximate the current stop surface 26. In lieu of utilizing dual-acting cylinder-piston assemblies 54 and 56, system 32 may utilize single-acting cylinder-piston assemblies 54, 56. Furthermore, as will be appreciated, the arrangement of several components could be reversed. For example, in lieu of stop surface 62 from this part of mounting portion 44 in lieu of link 60 having one end pivotally coupled to mounting portion 44, end 88 may alternatively be pivotally coupled to mounting portion 44 directly at a point proximate to the current location of stop surface 62 with link 60 pivotally coupled between end 86 of assembly 58 and central support 24 with stop surface 62 formed as part of central support 24. These and various other alternative configurations are contemplated within the scope of the present disclosure and independent claims.

Although the present invention has been described with reference to preferred embodiments, workers skilled in the art will recognize that changes may be made in form and detail without departing from the spirit and scope of the invention. Because the technology of the present invention is relatively complex, not all changes in the technology are foreseeable. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. A boom assembly comprising:
    a central support;
    a first wing pivotably coupled to the central support so as to rotate about a first axis;
    a first cylinder-piston assembly having a first end pivotably to the support and a second end pivotably coupled to the first wing at a first pivot point for rotation about a second axis on a first side of the first axis; and
    a second cylinder-piston assembly having a first end pivotably coupled to the support and a second end pivotably coupled to the first wing at a second pivot point for rotation about a third axis on a second side of the first axis, whereby extension and retraction of the first and second cylinder-piston assemblies applies varying opposing torques to the first wing depending upon an angular orientation of the first wing about the first axis.

2. The boom assembly of claim 1 including:
    a link having a first end pivotably coupled to the second end of the second cylinder-piston assembly for rotation about the third axis and a second end pivotably coupled to the first wing for rotation about a fourth axis; and
    a stop surface configured to engage the link to limit rotation of the link about the fourth axis.

3. The boom assembly of claim 1 wherein the first wing pivots in and out of a spray position in which the first axis lies in a plane parallel to the first wing and wherein the first and second pivot points are equidistantly spaced from the plane when the first wing is in the spray position.

4. The boom assembly of claim 1 wherein the first wing pivots in and out of a spray position in which the first axis lies in a plane parallel to the first wing, wherein the first and second pivot points are spaced from the plane by first and second distances, respectively, and wherein the first and second piston cylinder assemblies apply first and second forces at the first and second pivot points, respectively, based upon the first and second distances such that the first and second distance-cylinder assemblies apply equal but opposite torques about the first axis to the first wing wherein the first wing is in the spray position.

5. The boom assembly of claim 4 wherein the first and second distances are equal and wherein the first and second forces are equal.

6. The boom assembly of claim 1 wherein the piston-cylinder assemblies comprise dual-acting piston-cylinder assemblies.

7. The boom assembly of claim 1 wherein the first piston-cylinder assembly includes:
   a cylinder coupled to one of the support and the first wing, the cylinder including:
      a first chamber proximate the first wing and a second chamber distant the first wing;
      a piston disposed in the cylinder separating the first and second chambers; and
      a rod coupled to the piston and the other of the support and the first wing;
      wherein the boom assembly additionally includes:
         a source of fluid; and
         a fluid line in fluid communication between the first chamber and the source of fluid, wherein the fluid line is configured to restrict fluid flow to a maximum first rate from the first chamber to the fluid source as a volume of the first chamber is reduced.

8. The boom assembly of claim 7 including:
a one way valve in the fluid line permitting fluid flow from the source of fluid to the first chamber at a second maximum rate greater than the first maximum rate.

9. The boom assembly of claim 7 wherein the fluid line includes an orifice sized to restrict fluid flow.

10. The boom assembly of claim 7 wherein the second piston-cylinder assembly includes:
   a cylinder coupled to one of the support and the first wing, the cylinder including:
      a first chamber proximate the first wing and a second chamber distant the first wing;
      a piston disposed in the cylinder separating the first and second chambers; and
      a rod coupled to the piston and the other of the support and the first wing;
      wherein the boom assembly additionally includes:
         a source of fluid; and
         a fluid line in fluid communication between the first chamber and the source of fluid, wherein the fluid line is configured to restrict fluid flow to a maximum first rate from the first chamber to the fluid source as a volume of the first chamber is reduced.

11. The boom assembly of claim 1 including a second wing pivotably coupled to the central support so as to rotate about a fourth axis;
   a third cylinder-piston assembly having a first end pivotably coupled to the support and a second end pivotably coupled to the second wing at a third pivot point for rotation about a fifth axis up on a first side of the fourth axis; and
   a fourth cylinder-piston assembly having a first end pivotably coupled to the central support and a second end pivotably coupled to the second wing at a fourth pivot point for rotation about a sixth axis on a second side of the fourth axis, whereby extension and retraction of the third and fourth cylinder-piston assemblies applies varying opposing torques to the second wing depending upon an angular orientation of the second wing about the fourth axis.

12. A boom assembly comprising:
   a support;
   a first wing pivotably coupled to the support so as to rotate about a first axis;
   a first force applying member having a first end pivotably coupled to the support and a second end pivotably coupled to the first wing at a first pivot point for rotation about a second axis on a first side of the first axis, wherein the first force applying member is configured to apply a first force to the first wing; and
   a second force applying member, wherein the second force applying member is configured to apply a second force to the first wing such as the first and second force applying members apply opposing equal torques to the first wing about the first axis, whereby the first wing is held in a spray position, and a third force to the first wing such that the first wing is moved to a folded position.

13. The boom assembly of claim 12 wherein the first force applying member includes a cylinder-piston assembly.

14. The boom assembly of claim 12 wherein the second force applying member includes a cylinder-piston assembly.

15. The boom assembly of claim 12 including:
   a link having a first end pivotably coupled to the second end of the second force applying member for rotation about the third axis and a second end pivotably coupled to the first wing for rotation about a fourth axis; and
   a stop surface configured to engage the link to limit rotation of the link about the fourth axis.

16. The boom assembly of claim 12 wherein the first axis lies in a plane parallel to the first wing when the first wing is in the spray position and wherein the first and second pivot points are equidistantly spaced from the plane when the first wing is in the spray position.

17. The boom assembly of claim 12 wherein the first axis lies in a plane parallel to the first wing when the first wing is in the spray position, wherein the first and second pivot points are spaced from the plane by first and second distances, respectively, and wherein the first and second forces applied by the first and second force applying members are based upon the first and second distances.

18. The boom assembly of claim 17 wherein the first and second distances are equal and wherein the first and second forces are equal.

19. The boom assembly of claim 14 wherein the second force applying member includes:
   a cylinder coupled to one of the support and the first wing, the cylinder including:
      a first chamber proximate the first wing and a second chamber distant the first wing;
      a piston disposed in the cylinder separating the first and second chambers; and
      a rod coupled to the piston in the other of the support and the first wing;
   wherein the boom assembly additionally includes:
      a source of fluid; and
      a fluid line in fluid communication between the first chamber and the source of fluid, wherein the fluid line is configured to restrict fluid flow to a maximum first rate from the first chamber to the fluid source as a volume of the first chamber is reduced.

20. The boom assembly of claim 12 including a second wing pivotably coupled to the support so as to rotate about a fourth axis.

21. A boom assembly comprising:

a support;

a wing pivotably coupled to the support so as to rotate about a first axis;

first means coupled between the support and the wing for applying a first force to the wing on a first side of the first axis; and second means coupled between the support and the wing for applying a second force to the wing on a second opposite side of the first axis such that the first and second means apply opposing equal torques to the first wing about the first axis, wherein the wing is held in a spray position, and for applying a third force to the wing such that the wing is moved to a folded position.

22. A sprayer comprising:

a fluid reservoir;

a central support; and a plurality of ground engaging motive members supporting the fluid reservoir and the central support above ground;

a wing pivotably coupled to the support so as to rotate about a first axis;

a plurality of spray nozzles fluidly connected to the fluid reservoir and carried by the wing;

a first cylinder-piston assembly having a first end pivotably to the support and a second end pivotably coupled to the wing at a first pivot point for rotation about a second axis on a first side of the first axis;

a second cylinder-piston assembly having a first end pivotably coupled to the support and a second end pivotably coupled to the wing at a second pivot point for rotation about a third axis on a second side of the first axis, whereby extension and retraction of the first and second cylinder-piston assemblies applies varying opposing torques to the wing depending upon an angular orientation of the wing about the first axis.

* * * * *